US005763837A

United States Patent [19]
Davignon et al.

[11] Patent Number: 5,763,837
[45] Date of Patent: Jun. 9, 1998

[54] AUTOMATIC BIOMETRIC DATA SYSTEM

[76] Inventors: André Davignon, 685 Côte Ste-Catherine, Montreal, Quebec, Canada, H2V 2C7; Alain Boutin, 2070 De Maisonneuve, Apt. 73, Montreal, Quebec, Canada, H3H 1K8

[21] Appl. No.: 822,620

[22] Filed: Mar. 20, 1997

Related U.S. Application Data

[63] Continuation of Ser. No. 320,279, Oct. 11, 1994, abandoned.
[51] Int. Cl.⁶ .................... G01G 19/22; G01G 19/00; G01S 15/00
[52] U.S. Cl. .................. 177/25.13; 177/245; 33/1 P; 367/99; 367/908
[58] Field of Search .................... 177/25.11, 25.13, 177/245; 33/1 P; 73/290 V, 597, 1.79, 1.81, 1.82, 1.86, 1.88; 367/99, 100, 908; 364/562, 571.02

[56] References Cited

U.S. PATENT DOCUMENTS

| 4,113,039 | 9/1978 | Ozaki et al. | 177/25.13 |
|---|---|---|---|
| 4,821,206 | 4/1989 | Arora | 364/513 |
| 4,923,024 | 5/1990 | Ferrer et al. | 177/245 |
| 5,122,991 | 6/1992 | Koike et al. | 367/127 |
| 5,124,954 | 6/1992 | Hordijk | 367/99 |
| 5,157,639 | 10/1992 | Leazczynski | 367/99 |
| 5,254,992 | 10/1993 | Keen et al. | 177/210 R |

*Primary Examiner*—M. L. Gellner
*Assistant Examiner*—Randy W. Gibson
*Attorney, Agent, or Firm*—Swabey Ogilvy Renault; Guy J. Houle

[57] ABSTRACT

A measuring apparatus and method for calculating height and weight of human subjects in one step. A scale having a weight sensor is provided to sense the weight of a subject standing thereon. A sonar head is positioned stationary a predetermined distance above the scale sufficient to permit a subject to stand upright on the scale and below the sonar head. The sonar head has a sound wave emitter and a plurality of sound wave receptors. A Digital Signal Processing circuit(DSP) is connected to the sonar head and is activated when the operator initiates a measurement. The data processing circuit is controlled by a software to calculate the weight and height of the subject. The apparatus and method also provides additional data on the subject, such as the body surface area, BA, body mass index BMI, percentiles height and weight. The (DSP) circuit produces a short burst of sound waves that travel downwards, hit the target (patient's head) and return towards the sonar head. During the travel of the sound wave, the (DSP) circuit digitizes the output of 8 microphones and memorizes the data for post processing. The (DSP) circuit communicates with the scale to measure the weight of the target. This sequence is repeated 4 times to provide signals averaging before the (DSP) software analysis.

18 Claims, 6 Drawing Sheets

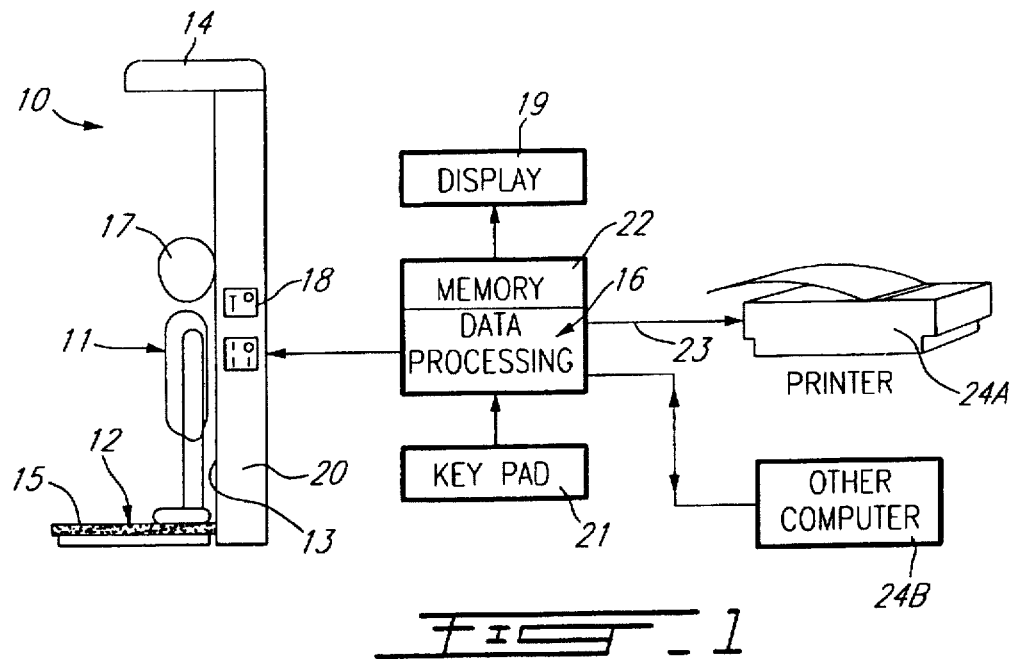
FIG_1
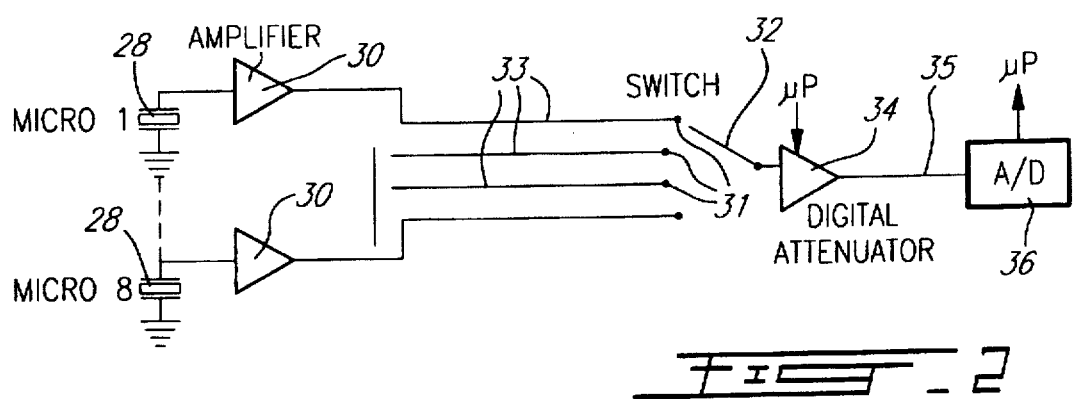
FIG_2

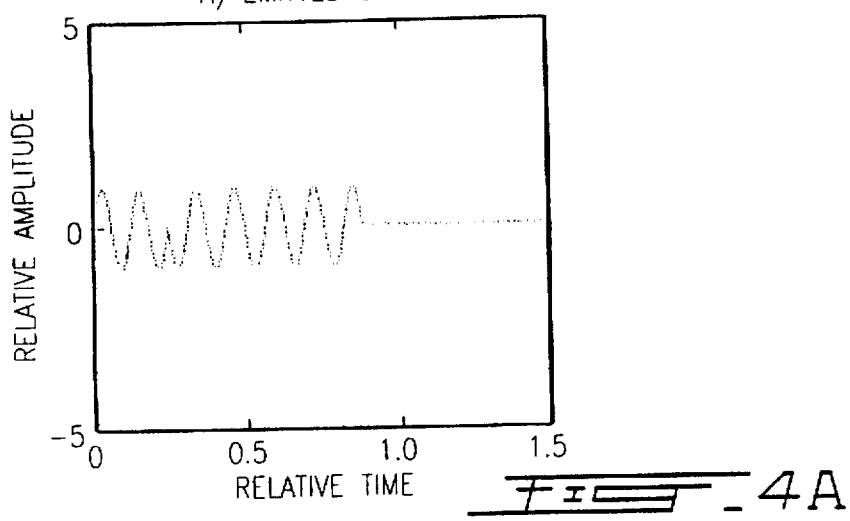
FIG_4A
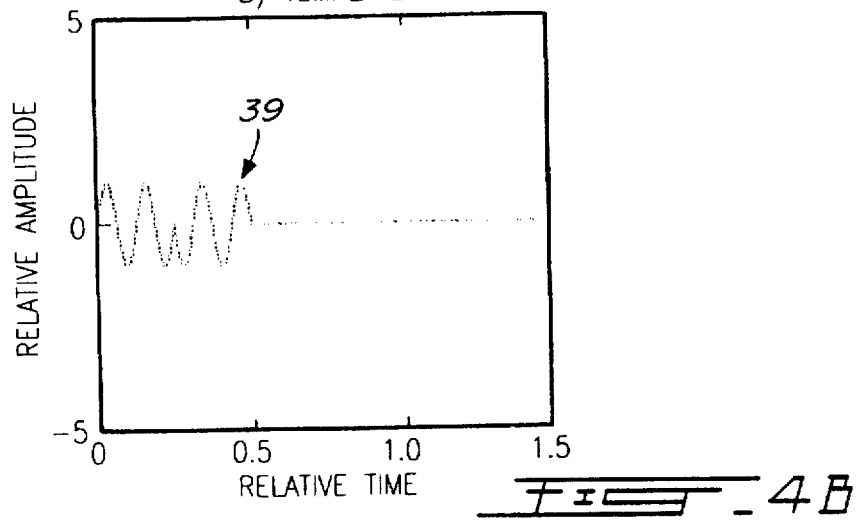
FIG_4B
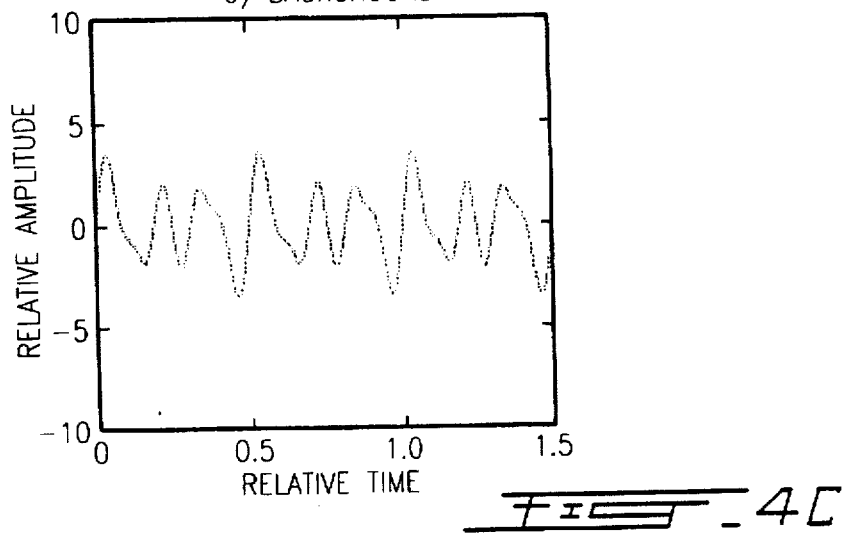
FIG_4C

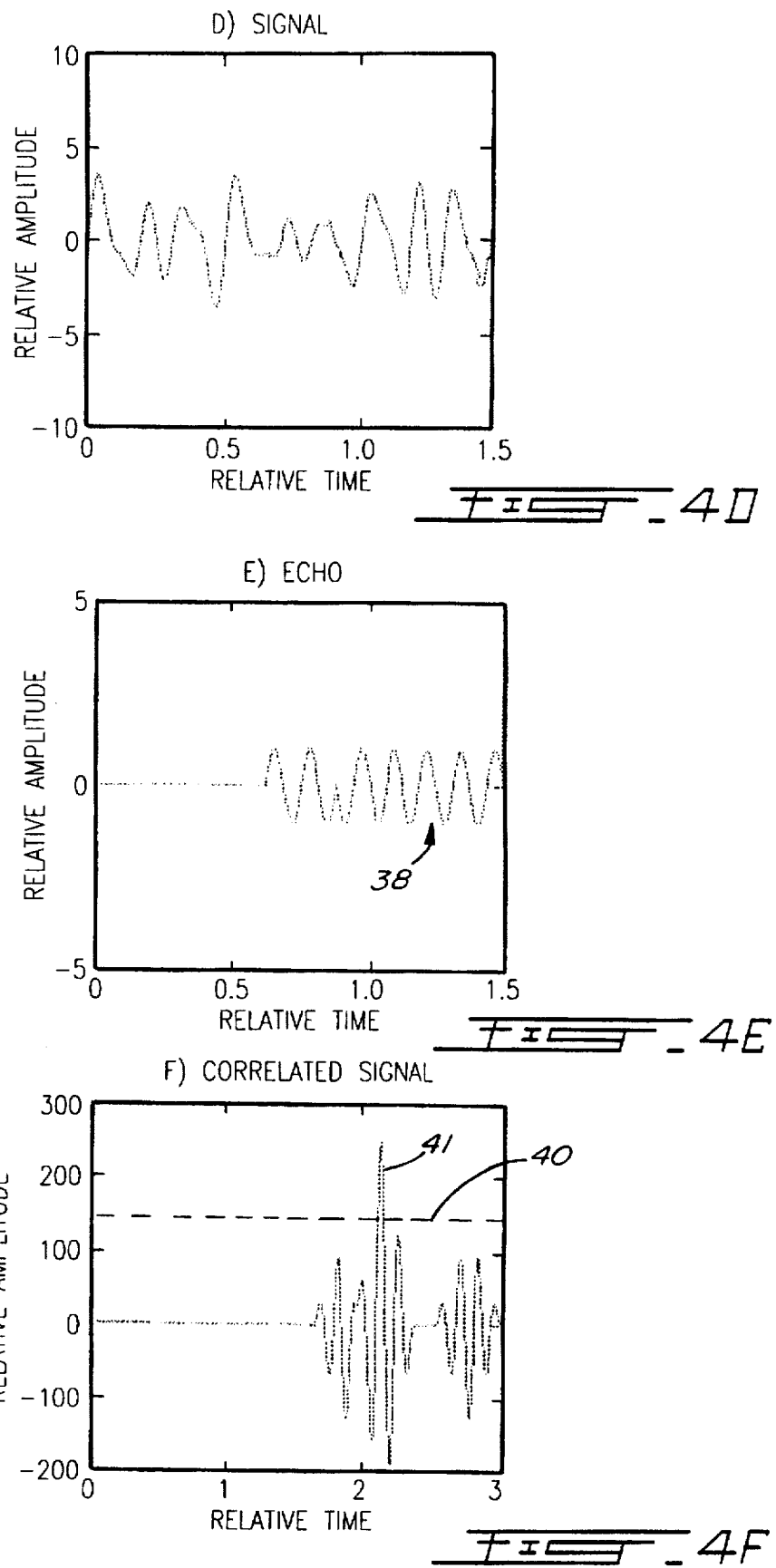

AUTOMATIC BIOMETRIC DATA SYSTEM

This is a continuation of application Ser. No. 08/320,279 filed Oct. 11, 1994, and now abandoned.

TECHNICAL FIELD

The present invention relates to an apparatus and method for measuring height and weight of human subjects using an electronic scale and a sonar head. The apparatus and method are also capable of calculating surface area BA, body mass index BMI and percentile height and weight for the age and sex of the subject.

The automated system and method of the present invention measures the weight and height of human subjects, children and adults. This system makes use of sonic waves to calculate the height of the subject. The results are given in absolute figures (height, weight, BA, BMI) and in terms of the percentile for a normal population of the same age and sex. The results are printed on stickers which can be easily pasted in the subject's file, and the data are also accumulated by the onboard non-volatile memory to be uploaded later in an institution's main frame computer.

Height and weight measurement of individuals are an important part of clinical evaluation, both in public and private clinics. Most corporations will also request, before hiring an employee, a complete physical examination that include those measurements. These measurements may take a certain time, and errors can happen when obtaining the data or during transcription of the results on the subject's chart. In addition, in medicine, many normal parameters are now indexed to the body surface area which is derived from height and weight by using a chart. This is, again, time consuming and involves errors in calculation and transcription. In pediatrics, it is also customary to plot the patient's height and weight on percentile curves for normal subjects. This involves, of course, plotting their parameters on graph and transcribing the results in the patient's file.

BACKGROUND ART

Height and weight have been routinely measured in patients at least since the beginning of this century. Weight measurements, at the beginning, made use of classical scales with counterweight, and later equipment sophisticated has been developed which uses tension gauges with digital output, and the weight is usually displayed on a screen using light emitting diodes. However, measurements of height has not progressed in the same fashion and it is still done in a rather primitive fashion comparing the patients height to a ruler graduated either in inches or centimeters, although a few developments have been disclosed in patent literature. In babies, a tape measure is conventionally used.

A typical example of a patented apparatus for automatically measuring height is described in U.S. Pat. No. 4,518,052 where a digital read-out is provided. In one of its aspects, the height and weight measuring machine uses infrared rays that are impinged upon a subject's head at a slanted angle whereby some rays are reflected horizontally to pass through a transparent glass graduated scale in the front of the body. Sensors detect this reflected ray and a measurement of height is obtained, but there is still mechanical manipulation The weight is provided by a scale on which the person stands. It is also important that the patient assumes a very precise position with respect to a sliding plate disposed in a vertical frame.

Reference is also made to Japanese Specification 5828609 of Matsushita Denki K. K. which describes a system to measure height by transmitting ultrasonic waves to the head part of the human subject, and measuring the time during which the reflected wave arrives. The circuit measures the time during which the ultrasonic wave propagates back and forth between an emitter and the floor surface on which the subject is standing as well as the head of the subject. One problem with using ultrasonic pulses is that these pulses can bounce off hair pins in the hair of the patient and provide false signals. There are also false signals provided by environmental objects, and calculations of height is difficult to obtain from the method and apparatus described. Another disadvantage of prior art apparatus is that they are time consuming to use and provide automatic output information on only one parameter of a subject.

SUMMARY OF INVENTION

It is therefore a feature of the present invention to provide an automatic apparatus and method for measuring the height and weight of human subjects which substantially overcome all of the above-mentioned disadvantages of the prior art.

Another feature of the present invention is to provide an automatic measuring apparatus and method for calculating height and weight of human subject wherein these measurements can be obtained quickly with increased precision and without transcription errors, and further wherein the data can be accumulated in a computer to be uploaded in a patients computer chart or other computer systems.

Another feature of the present invention is to provide an automatic measuring apparatus and method for measuring the height and weight of human subjects wherein the height is calculated using sound waves and the weight is measured with a load cell.

Another feature of the present invention is to provide an automatic measuring apparatus and method for calculating the height and weight, and further capable of providing data on the body surface area body mass index and percentile for the age and sex of the subject as well as calculating the subject's age based on relevant parameters entered into the computer by the operator.

According to the above features, from a broad aspect, the present invention provides an automatic measuring apparatus for automatically calculating height and weight of human subjects. The apparatus comprises an electronic scale having a weight sensor to sense the weight of the subject standing thereon. A sonar head is positioned stationary a predetermined distance above the scale sufficient to permit a subject to stand upright on the scale and below the sonar head. The sonar head has a central sound wave emitter and at least two sound wave receptors positioned about the emitter in a horizontal plane. The sound wave emitter produces low frequency long wave echo signals. A digital processing circuit is connected to the receptors. Means is provided to activate the digital data processing circuit and simultaneously obtain reference signals for calibration without the subject standing on the scale to produce background reference signals. The sound wave receptors and the weight sensor provides digital output measurement signals to the digital processing means representative of measurements of a subject standing upright on the scale. The digital processing circuit has a software to calculate the weight and height of a subject based on the measurement and background reference signals and using a triangulation method of processing received signals by calculating coordinates XYZ relative to the horizontal plane of the sonar head, and wherein X is the vertical distance between the plane and the top of the head of the subject, Y and Z are vectors in the plane from the center of the emitter.

According to a still further broad aspect of the present invention, there is provided a method for automatically measuring and calculating the height and weight of the subject using an electronic scale having a weight sensor to sense the weight of the subject standing thereon. A sonar head is positioned stationary a predetermined distance above the scale sufficient to permit a subject to stand upright on the scale and below the sonar head. The sonar has a central sound wave emitter and at least two sound wave receptors positioned about the emitter in a horizontal plane. A digital processing circuit is connected to the receptors. The method comprises the steps of:

(i) actuating said digital processing circuit prior to a subject being placed on said scale to obtain digital background reference signals.

(ii) placing said subject upright on said electronic scale and under said stationary sonar head having said sound wave emitter and said plurality of sound wave receptors, (iii) actuating said sonar head to emit a low frequency long wavelength signal and to receive in said digital processing circuit digital output measurement echo signals from said sound receptors, as well as weight signals from said scale, (iv) processing said digital output measurement signals and digital background reference signals in accordance with a software to calculate the weight and height of said subject, said processing step using a triangulation method of averaging received signal by calculating coordinated X, Y and Z relative to said horizontal plane of said sonar head, and wherein X is the vertical distance between said plane and the top of the head of said subject, and Y and Z are vectors in said plane from the center of said emitter.

BRIEF DESCRIPTION OF DRAWINGS

A preferred embodiment of the present invention will be described with reference to the accompanying drawings in which:

FIG. 1 is a simplified schematic view showing the measuring apparatus of the present invention and wherein the height and weight of the subject is being calculated automatically by the apparatus;

FIG. 2 is a simplified block diagram showing how the echoes or sound wave signals at the output of each sound receptor is processed to be converted into digital output measurement signals;

FIG. 4A is the emitted sound signal;

FIG. 4B is the template;

FIG. 4C is an illustration of the echo signal without a subject positioned on the scale (background);

FIG. 4D is an illustration of the signal with the patient positioned on the scale;

FIG. 4E is an illustration of the resultant signal when the signal of FIG. 4C is substracted from the signal of FIG. 4D;

FIG. 4F is an illustration of the signal of FIG. 4E correlated with the template of FIG. 4B;

DESCRIPTION OF PREFERRED EMBODIMENT

General

The sonar described in this text operates at a wavelength of 4.5 cm (frequency of 8 KHZ) which is unusual in sonar ranging system. There are multiple advantages of using such a wavelength. An hair clip on the patient's head will deform less the echo returned if its size is small relative to the wavelength. Movements of the patent's head will also cause less deformation on the echo if the wavelength is long thus permitting averaging of multiple echo together.

Long wavelength sound waves also penetrate better the hair yielding a cleaner echo.

Because long wavelength sonic transducer are wide bands, it is possible to emit a precise signal pattern with the sonar head 14 as shown in FIGS. 3A to 3D. The software that analyzes the echo looks for this typical pattern. This technique along with averaging, eliminates ambient noise and false echo.

The drawback of using long wavelength sonic transducer is their poor clamping factor. The ringing lasts longer. Being less directives, they cause also lateral cross-talk from the emitter to the receptor. Also, there is some internal reflection in the sonar head. All those factors are repetitive and need to be subtracted from the echo returned from the patient's head. The apparatus at "power up" need to be "zeroed". This implies that the software emits sonic signal and samples the echo without anybody on the scale. This empty echo is called background noise. It is memorized, and later on, substracted from the patient's echo when measuring a subject. This background noise is memorized only once at power up. The substraction is invisible to the operator. The operator measures his patient in only one key stroke and the software removes automatically the background noise from the echo.

With reference to FIGS. 1 to 3D, the new technique described herein digitizes the echo and processes it with software before comparing the signal with a threshold. Using long wave wavelength (audio range) allows the use of audio transducers, which are cheaper. Low frequencies also necessitate less expensive electronic. Because they are less directives, they can be placed out of the vertical axis centered in the middle of the patient's head 17. So by placing many receptors apart, triangulation can be performed to calculate the coordinates X, Y, Z, relative to a sonar head's reference plane (FIG'S. 2 and 5) the plane is horizontal and is formed by vectors Y and Z. Coordinate X is the vertical distance between the plane of the sonar head and the top of the patient's head. The X coordinate is independent of the coordinates Y and Z. That means the patient 11 can stand anywhere under the sonar head 14, the value of X (his height) after triangulation will not change.

Figures 3A, 3B:
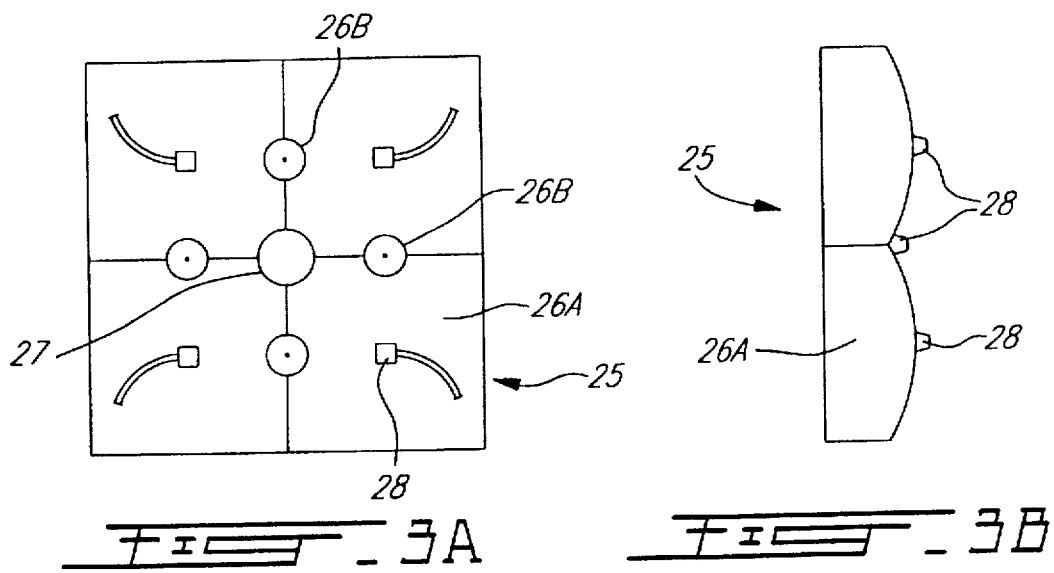
FIG. 3A is a bottom view showing the construction of the sonar head.
FIG. 3B is a side view of FIG. 3A.
Figures 3C, 3D:
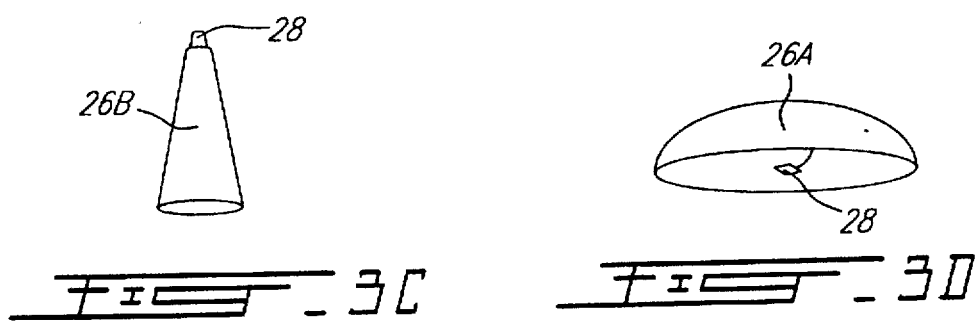
FIG. 3C is a perspective view of the microphone secured to the parabolic reflectors.
FIG. 3D is a perspective view of one parabolic reflector.

Referring to FIG. 3A, it can be seen that there are 8 microphones in the sonar head. They are grouped in two groups of 4. One group is made of 4 semi-directional collecting surface. They are made of a cone 26B with a microphone 28 at the end (FIG. 3C). The other group is made of 4 directional collecting surfaces. They are made of a parabolic reflector 26A with a microphone 28 suspended at its focus, as shown in FIG. 3D.

The four conic microphones 26B cover a distance of two feet from the plane of the sonar head where the parabolic microphones 26A cover the distance from two feet from the plane of the sonar head to the scale's pan. The software when processing the echo inspects the four conic microphones first. If it cannot find the echo, it then inspect the four other microphones.

Referring more particularly to FIG. 1, there is shown generally at 10 the automated measuring apparatus of the present invention for measuring the height and weight of a human subject 11 standing on an electronic scale 12 in an upright manner and assisted by a vertical post 13, having a flat non-reflective surface. The sonar head 14 is disposed a predetermined distance above a top flat surface 15 of the scale 12 to permit the subject 11 to stand upright therebetween, as herein illustrated. The sonar head 14 emits sound waves by the emitter 27 in the direction of the subject's head 17 and also receives echoes or reflected sound waves from the subject's head as well as from other objects in the room, such as the operator (not shown) and walls, etc., and these are considered to be reflected noise.

A data processing circuit or system 16 is connected to the sonar head 14 and to a scale 12, as well as to a thermistor assembly 18 which senses ambient temperature when the subject 11 is standing on the scale. These input connections feed analog signals to the data processing circuit 16. A keypad 21 is conveniently positioned on the wall member or post 20 or elsewhere to actuate the data processing circuit and to provide other control functions, and to input information into the data processing circuit 16. The processing circuit 16 is provided with a memory 22 controlled by a computer program. The output 23 of the data processing circuit 16 is connected to a display 19, a printer 24A or other output devices 24B to provide a print-out or display of information relating to the subject 11 being analyzed.

Referring to FIGS. 3A and 3B, there is shown the construction of the sonar head 14. As herein shown, it consists of a substantially rectangular housing 25 having four parabolic microphones 26A and four conic microphones 26B at the center of which is mounted a sound emitting device 27 capable of transforming an electric signal into an acoustic signal. A plurality of sound wave receptors are provided by microphones 28. The housing 25 as shown in FIGS. 1 and 3A is secured with its receptive plane 26 disposed substantially parallel to the upper flat support surface 15 of the scale 12.

Summarizing briefly the operation of the apparatus and method for automatic measurement of a subject's height and weight, the subject is positioned to stand upright on the scale 12 which is a standard digital scale. The sonar head is actuated through or keypad 21 to start emitting sound waves in the direction of the subject. The software then automatically determines the height and weight first of the subject. Thus the BA and BMI are calculated from height and weight. An operator then enters basic data into the data processing circuit by means of the display 19 and the keypad 21. This basic data includes the date of birth, sex and a file number pertaining to the subject 11. The software calculates the age of the patient from an internal clock/calendar calculator. The software then chooses the proper growth height and weight tables relative to the sex and age category of the subject. It then calculates the percentile weight and height from these tables. Body area is calculated from Dubois's formula. Within a few seconds, the data processing circuit feeds results to the display 19, to the printer 24A where the height, weight, body surface area, body mass index and percentile for the age and sex of the subject, as well as the file number for identification of the subject is printed. The print-out can be provided on label paper which is then immediately pasted on the file of the subject by the operator, who can be a technician or nurse.

The percentile for height and weight of the patient is given using equations derived from data readily available and stored in the memory 22.

Detailed

At "power up" the apparatus performs two procedures (either automatically self-initialized at power up or initiated by the operator). First, the scale is zeroed, second, the background noise (sonic noise from cross-talk and ringing between the emitter and the receptors, lateral reflections of sound, non-linearity of the transducers, etc.) is digitized with nobody between the scale and the sonar head.

The data from the first and second is kept in memory until another calibration procedure is initiated. The apparatus is then ready for measurements. The operator initiates a measurement by punching a key or keys on the keypad 21, when the patient is standing between the scale and the sonar head. The software reads the scale, excite the emitter, digitizes the echo, removes the background, locates the echo of the target for each channel triangulates and determines the height of the patient. These operations are explained in detail in the following paragraph.

When the operator initializes a measurement via the keypad 21, the processor excites the emitter 27 to generate a sound wave. The emitter transforms an electric signal into an acoustic signal. The sound wave of this acoustic signal travels downward, hits the subject 11 and other objects in the area thereof, and reflects back to the microphones 28. The reflected signal is known in the art as an echo, and the echo is transformed into an electric signal by the microphones.

As shown in FIG. 2, the reflected signals are then amplified by the amplifiers 30 and directed to poles 31 of a multi-position switch 32 which is operated by the data processing circuit or computer 16. The software controls the circuit to alternatively select one of the channels 33 connected to their respective microphones, herein eight microphones 28. The switch selects the channel in numerical order from one to eight and wraps around to channel 1, at a speed of the sampling rate (62500 samples/sec.), etc. The signal received in the selected channel is then attenuated by a control amplifier/attenuator 34 having a gain which is proportional to the square of the sound wave flight time. The purpose of this is to compensate for the loss of power of echo which is proportional to the square of the target distance, thus the flight time. The resulting scaled signal at the output 35 of the attenuator 34 is then fed to an analog to digital converter 36, and the sampled data signal is stored in a temporary memory of the computer. It is pointed out that the data processing circuit 16 sets the gain automatically every time a height measurement is taken by monitoring the sound pulses. The pulses are also clocked as they are transmitted and received.

With reference to FIGS. 4A to 4F, the data processing circuit 16 processes the digitized input signal measurements. Digital signal substraction is used in order to separate the echo of the patient from the background noise. In order to locate the echo from the target (circle 17' in FIG. 5) with precision, and to eliminate more noise, the resulting signal 38 is cross-correlated with a template 39 (FIG. 4B). This template is the same shape as the target's (subject) echo. The resulting correlated signal is then free of the ambient room noise. FIG. 4F is a representation of the signal correlated with the template.

When a match is encountered, lobes appear in the cross-correlated signal, as shown in FIG. 4F. If a lobe 41 is higher than the determined threshold, the threshold being represented at 40, this lobe 41 is chosen and its crest is located with precision. This yields the round-trip flight time of the sound wave from the emitter to the patient's head back to the corresponding microphone.

The same process is repeated for the seven other channels (microphones) of the sonar head.

The data processor 16 also calculates the speed of sound, and this is effectuated by the software which reads the temperature signals from the thermistor assembly 18 to apply a correction factor in the calculation. The software combines the time of flight with the speed of sound to calculate the equivalent round-trip distance covered by the sound wave.

Figure 5:
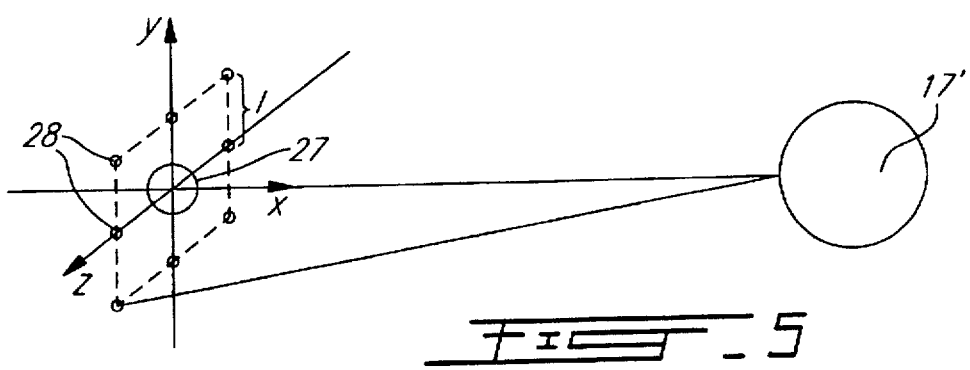
FIG. 5 is a schematic illustration showing how the distance between the emitter and the uppermost portion of the patient's head is calculated using triangulation.

As shown in FIG. 5, triangulation is done to calculate the exact three-dimensional position of the target, herein the uppermost portion of the subject's head 17' relative to the sonar head assembly or its receiving surface or place 26. The microphones yield four equations and there are three unknown coordinates. The coordinates X Y and Z axes are calculated by the software The extra equation is used to verify the coherence of the three others. The vertical distance coordinate X, see FIG. 5, between the place formed by the microphones 28 and the uppermost part of the subject's head 17' is known from the solution of those equations. This triangulation has the advantage of calculating height of the patient's head independently of the position of the patient on the scale. So the patient does not need to stand directly under the center of the sonar head. This simplifies the work of the operator. The coordinates Y-Z are used by the software to determine if the echo is the one returned by the patient and not from the nurse.

Because the sonar head is fixed, the software knows the calibration distance between the surface 26 of the sonar head or the plane of the microphones and the flat top surface of the scale. The height of the patient can then be calculated by obtaining the difference between the calibration distance and the vertical distance between the plane of the microphones and the uppermost portion of the head 17' of the subject.

The results are displayed on a printer 24A or a display 19 and can be transmitted to a far end central computer 24B. The operator can store the anthropometric data of his patient along with his file number in a permanent memory module 22 to be retrieved at a subsequent visit of the patient for comparison purpose.

The sonar compensate the gain of the amplifier of the echo as the distance of the target increases.

The velocity of sound (v) is given by this relation:

$$V = 341.4 \, m/s \sqrt{\frac{T+273}{273}}$$

where T is the ambient temperature in celcius.

The velocity of sound only changes a few percentage over the operating temperature range of the apparatus ≈20°–30° C. So in first approximation, v can be treated as a constant. From the relation v·t=d, where t is the flight time of the sound wave and d is the distance traveled, if v can be assimilated to a constant, the relation becomes:

t∝d

The distance d of the target d is unknown but is directly proportional to, time of flight t. Also it is known that the amplitude of the echo A is inversaly proportional to the square of the distance of the reflecting target d:

$A \propto d^{-1}$

From these relations the gain of the amplifier can be adjusted proportional to the square of the flight time of the sound wave instead of the distance of the target. This approximation is used to adjust the gain of the amplifier in the apparatus.

When the echo is sampled, it is averaged and the echo is located in each channel by cross-correlating it with a template. The shape of the template (FIG. 4B) is in permanent memory and is never changed. It is like a picture of the shape of the echo. Each channel is searched form this particular shape. Cross-correlation is used as mathematical calculations. The equations is as follows:

$$C_i = \sum_{n=0}^{m} Tn \, Sn + i,$$

where $C_i$ is the $i^{th}$ point of the correlated vector C, Tn is the $n^{th}$ point of the template T and S is the data from the sampled channel and m is the size of the template.

FIG. 4b shows the typical shape of the expected echo. It is a template. The effects of the non-linearity of the transducers, their response time, and their bandwidth, etc. are not shown for clarity. This template is formed during calibration at the factory by presenting the sonar a target, telling the software exactly at what distance from the sonar head the target is located. The software then memorizes the echo. It will have learned what looks like the echo and for all subsequent measurements, during the life of this apparatus, the software will use this template.

FIG. 4A shows the emitted signal. There is sudden phase inversion after the second cycle to increase the amplitude of the center lobe in the correlated vector (FIG. 4F). FIG. 4C shows the background noise made mainly of ringing and cross talk from the emitter. FIG. 4D shows the background noise mixed with the echo from the target. The echo is buried. Signal substraction is used to eliminate the background noise and isolate the echo alone (FIG. 4E).

FIG. 4F shows the vector resulting from correlating the template (FIG. 4B) with the echo (FIG. 4E). The center lobe is the place on the signal (FIG. 4E) where the template (FIG. 4B) matches the best. The crest of the center lobe is located by software with precision. Its distance from the origin (left) is the round trip flight time of the sound wave for the channel calculated.

After the software has calculated the round trip flightime of the sound wave, four flight times are available.

Yielding 4 equations to solve 3 unknown triangulation is made 4 times (FIG. 5)

|  | Channels | Yielding |
| --- | --- | --- |
| 1st time | 1, 2, 3 | $X_1, Y_1, Z_1$ |
| 2nd time | 1, 2, 4 | $X_2, Y_2, Z_2$ |
| 3rd time | 1, 3, 4 | $X_3, Y_3, Z_3$ |
| 4th time | 2, 3, 4 | $X_4, Y_4, Z_4$ |

Coordinates $X_1$ to $X_4$ are compared to each other. If they are not all within one centimeter, the software rejects the result and the operator is warned. If the software mislocate the echo on one channel, this mislocation will be a multiple of the wavelength (4.5 cm). Thus the gap between MAX($X_1$, $X_2$, $X_3$, $X_4$) and MIN ($X_1$, $X_2$, $X_3$, $X_4$) will be greater than 1 centimeter. In that case the software abort any further calculation.

Referring to FIGS. 2 and 5, the following equations for the triangulation where $D_1$ to $D_4$ are the round trip distance of the sound wave between the emittor, the reflecting target back to the corresponding microphone number 1 to 4.

$Z_1=4\cdot1\cdot1\cdot D_1\cdot D_2+D_3\cdot D_3\cdot D_1\cdot D_1+D_2\cdot D_2\cdot D_1\cdot D_3+D_2\cdot D_2\cdot D_1\cdot D_1-4\cdot1\cdot1\cdot D_1\cdot D_1-D_1\cdot D_1\cdot D_1\cdot D_3-D_1\cdot D_1\cdot D_1\cdot D2-D_3\cdot D_3\cdot D_1\cdot D_2)/(d\cdot1\cdot D1\cdot D_1+4\cdot1\cdot D_1\cdot D_3);$ $Y_1=-Z_1\cdot(D_1+D_2)/(D_1-D_2)-(D_1\cdot D_2/2/1+1);$ $X_1=(-2\cdot1\cdot1-2\cdot1\cdot Y_1+2\cdot1\cdot Z_1+D_1\cdot D_1)2/D_1;$ $X_1=\sqrt{(X_1\cdot X_1-Y_1\cdot Y_1-Z_1\cdot Z_1)};$ $Z_2=(4\cdot1\cdot1\cdot D_1\cdot D_2+D_4\cdot D_4\cdot D_1\cdot D_1+D_2\cdot D_2\cdot D_1\cdot D_4+D_2\cdot D_2\cdot D_1\cdot D_1-4\cdot1\cdot1\cdot D_1\cdot D_1-D_1\cdot D_1\cdot D_1)D_4-D_1\cdot D_1\cdot D_1\cdot D_2-D_4\cdot D_4\cdot D_1\cdot D_2)/(4\cdot1\cdot D_1\cdot D_2+4\cdot1\cdot D_1\cdot D_4);$ $Y_2=-Z_2(D_1+D_2)/(D_1-D_2)-(D_1\cdot D_2/2/1+1);$ $X_2=(-2\cdot1\cdot1-2\cdot1\cdot Y_2+2\cdot1\cdot Z_2+D_1\cdot D_1)/2/D_1;$ $X_2=\sqrt{(X_2\cdot X_2-Y_2\cdot Y_2-Z_2\cdot Z_2)};$ $Z_3=(4\cdot1\cdot D_3\cdot D_4-4\cdot1\cdot1\cdot D_4\cdot D_4+D_2\cdot D_2\cdot D_4\cdot D_4-D_2\cdot D_2\cdot D_3\cdot D_4-D_4\cdot D_4\cdot D_2\cdot D_4-D_4\cdot D_4\cdot D_3\cdot D_4+D_3\cdot D_3\cdot D_4\cdot D_4+D_3\cdot D_3\cdot D_2\cdot D_4)/(4\cdot1\cdot D_4\cdot D_4+4\cdot1\cdot D_2\cdot D_4);$ $Y_3=-Z_3(D_3+D_4)/(D_3-D_4)+(D_3\cdot D_4/2/1+1);$ $X_3=(-2\cdot1\cdot1+2\cdot1Y_3+2\cdot1\cdot Z_3+D_4\cdot D_4)2/D_4;$ $X_3=\sqrt{(X_3\cdot X_3-Y_3\cdot Y_3-Z_3\cdot Z_3)};$ $Z_4=(4\cdot1\cdot1\cdot D_1\cdot D_4-4\cdot1\cdot1\cdot D_1\cdot D_3+D_1\cdot D_1\cdot D_4\cdot D_4-D_1\cdot D_1\cdot D_1\cdot D_4-D_3\cdot D_3\cdot D_1\cdot D_1-D_3\cdot D_3\cdot D_1\cdot D_4+D_1\cdot D_1\cdot D_1\cdot D_3+D_1\cdot D_3\cdot D_4\cdot D_4)/(-4\cdot1\cdot D_1\cdot D_1+4\cdot1\cdot D_1\cdot D_3);$ $Y_4=-Z_4(D_3+D_4)/(D_3-D_4)+(D_3\cdot D_4/2/1+1);$ $X_4=(-2\cdot1\cdot1+2\cdot1\cdot Y_4+2\cdot1\cdot Z_4+D_4\cdot D_4)2/D_4;$ $X_4=\sqrt{(X_4\cdot X_4-Y_4\cdot Y_4-Z_4\cdot Z_4)};$ The software calculates the body mass index (BMI) using this following relation:
BMI=$W/H^2$ where W is the weight of the patient and H is the height of the patient. Also the software calculates the body area (BA) following this relation:

$$BA = \frac{W^{.425} H^{.725}}{4.94}$$

Figure 6:
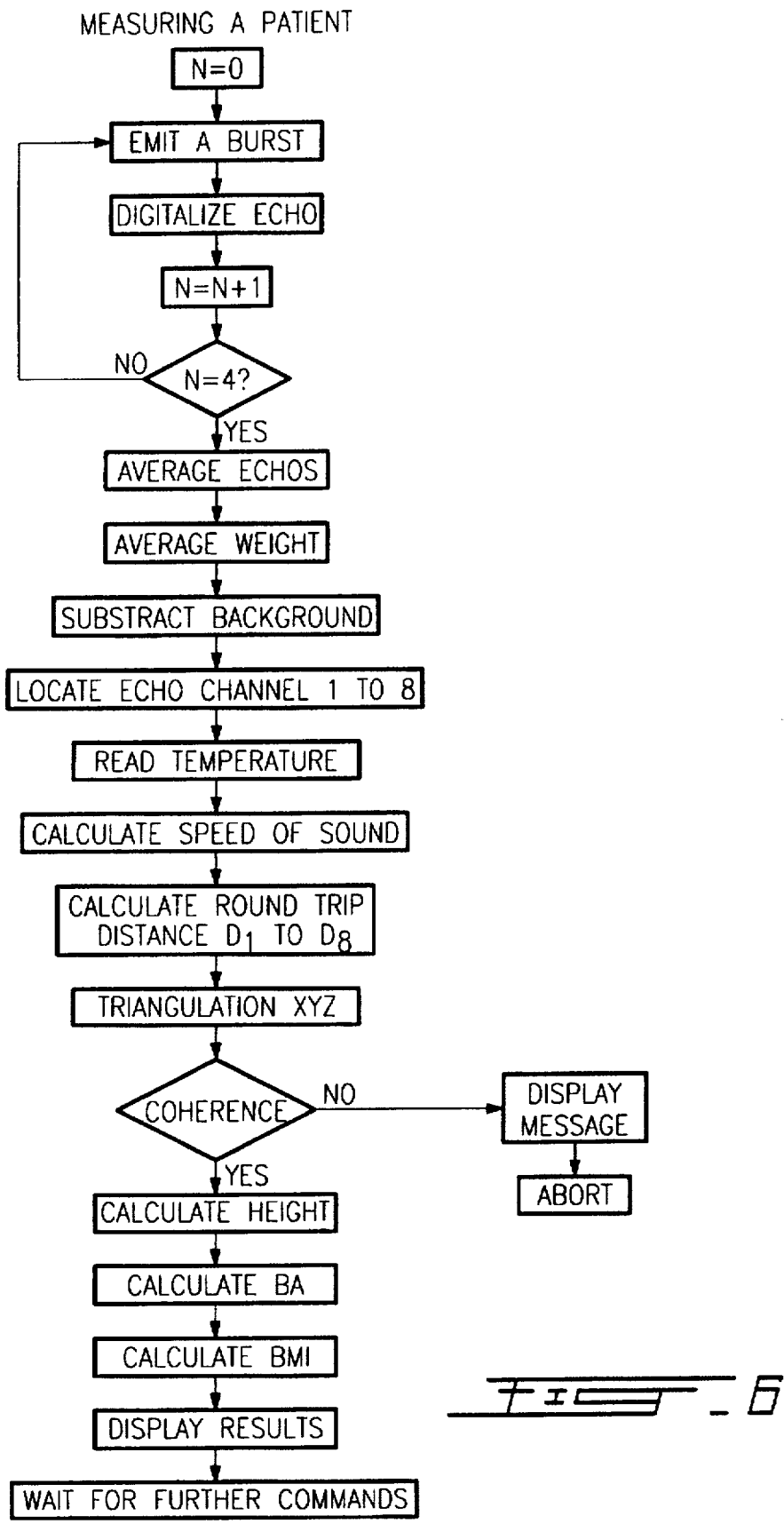
FIGS. 6 and 7 are a flow charts of the software implementation.
Figure 7:
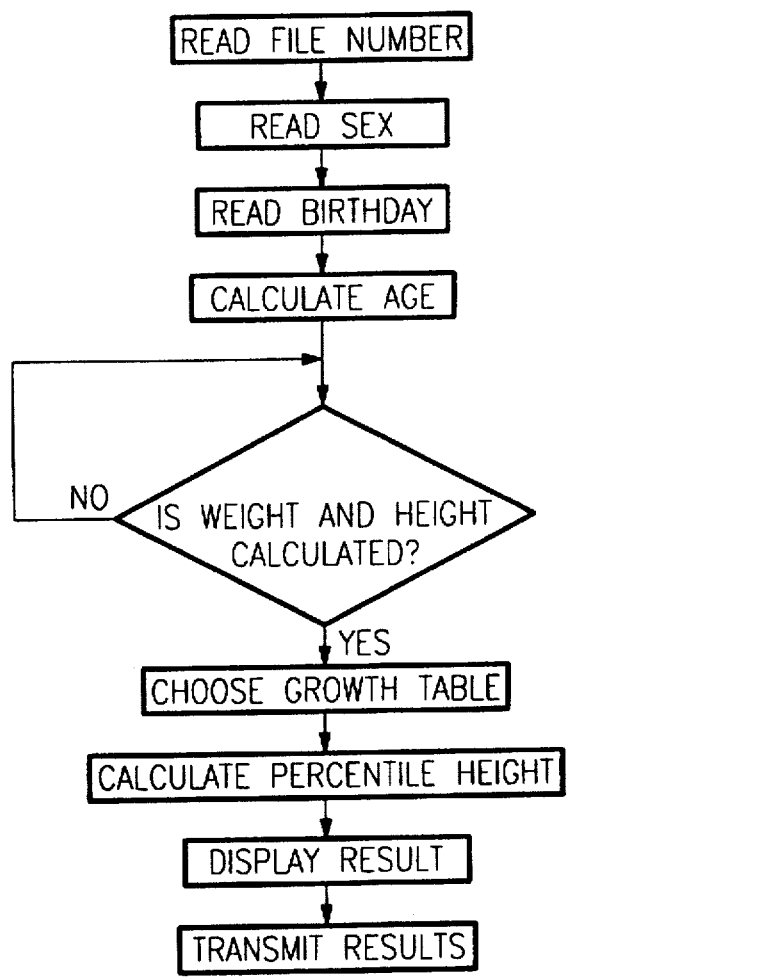

FIGS. 6 and 7 are flow charts showing the program implementation of the software for measuring a subject and for effecting the percentiles calculations.

It is within the ambit of the present invention cover any obvious modifications of the preferred embodiment described herein, provided such modifications fall within the scope of the appended claims. It is also conceived that this apparatus may be modifiable to provide, in addition with the parameters herein described, a parameter indicative of the body temperature of the subject, blood pressure, pulse rate, and peripheral oximetry.

We claim:

1. An automatic measuring apparatus for automatically calculating height and weight of human subjects, said apparatus comprising an electronic scale having a weight sensor to sense the weight of a subject standing thereon, a sonar head positioned stationary a predetermined distance above said scale sufficient to permit a subject to stand upright on said scale and below said sonar head, said sonar head having a central sound wave emitter and at least two sound wave receptors positioned about said emitter in a horizontal plane, said sound wave emitter producing low frequency long wave echo signals, a digital processing circuit connected to said receptors, means to activate said digital data processing circuit and simultaneously obtain reference signals for calibration without said subject standing on said scale to produce background reference signals, said sound wave receptors and weight sensor providing digital output measurement signals to said digital processing means representative of measurements of a subject standing upright on said scale, said digital processing circuit having a software to calculate the weight and height of said subject based on said measurement and background reference signals and using a triangulation method of processing received signals by calculation coordinates X, Y and Z relative to said horizontal plane of said sonar head, and wherein X is the vertical distance between said plane and the top of the head of said subject, and Y and Z are vectors in said plane from the center of said emitter, said echo signals being emitted at a frequency of 8 KHz to obtain reduced deformations in reflected echoes caused by movement of the subject's head or foreign objects on said subject's head.

2. An automatic measuring apparatus as claimed in claim 1 wherein there are a plurality of said sound wave receptors.

3. A measuring apparatus as claimed in claim 2 wherein said sonar head has a housing having said horizontal plane faxing downwards and parallel to said scale, said sound wave emitter being disposed centrally in said housing in said horizontal plane with said sound wave receptors equidistantly spaced about said sound wave emitter in said plane, means to secure said housing with said receptive surface substantially parallel to an upper flat support surface of said scale, said digital processing means also calculating the body surface area of said subject from said signals received from said receptors.

4. A measuring apparatus as claimed in claim 3 wherein there are eight of said receptors positioned about said sound wave emitter on straight axes defining a square configuration.

5. A measuring apparatus as claimed in claim 4 wherein said housing is formed by four parabolic microphones and four conic microphones; said parabolic microphones comprising four parabolic reflectors having a square contour and positioned in a square to form a square housing, a microphone held at a converging point of said reflectors in said horizontal plane; said conic microphones being comprised by four cones disposed on transverse axes disposed between said parabolic reflectors and aligned with said microphones of said reflectors and a microphone at a terminal end of said cones in said horizontal plane and aligned with other microphones.

6. A measuring apparatus as claimed in claim 1 wherein said receptors are each connected to an amplifier, each said amplifiers having their outputs connected to a common A/D converter through a multipolar switch controlled by said digital processing circuit and an amplifier/attenuator connected between said switch and said A/D converter to attenuate signals received from a selected one of said outputs, said amplifier/attenuator having a gain proportional to the square of the flight time of said sound wave generated by said emitter to compensate for loss of power of the echo of said sound wave which is proportional to the square of the distance to an uppermost part of said subject, said flight time being clocked by said processing circuit.

7. A measuring apparatus as claimed in claim 1 wherein there is further provided a temperature sensor to provide a calibration temperature signal representative of the ambient temperature in which said subject is positioned on said scale to obtain a correction signal for calculating the travel distance of said sound wave.

8. A measuring apparatus as claimed in claim 1 wherein said software also provides the percentile for height and weight of the subject using known equations which are stored in a memory of said data processing means, said digital processing circuit having a keypad connected to an input of said computer to input parameters of said subject necessary to calculate said percentile, and a printer secured to an output of said circuit to provide a print-out of said height, weight, body surface area, percentile age and other information pertinent to said subject.

9. A measuring apparatus as claimed in claim 1 wherein there is further provided a vertically upstanding member disposed adjacent said scale to assist positioning a subject upright on said scale and in alignment with said sonar head.

10. An automatic measuring apparatus for automatically calculating height and weight of human subjects, said apparatus comprising an electronic scale having a weight sensor to sense the weight of a subject standing thereon, a sonar head positioned stationary a predetermined distance above said scale sufficient to permit a subject to stand upright on said scale and below said sonar head, said sonar head having a central sound wave emitter and at least two sound wave receptors positioned about said emitter in a horizontal plane, said sound wave emitter producing low frequency long wave echo signals, a digital processing circuit connected to said receptors, means to activate said digital data processing circuit and simultaneously obtain reference signals for calibration without said subject standing on said scale to produce background reference signals, said sound wave receptors and weight sensor providing digital output measurement signals to said digital processing means representative of measurements of a subject standing upright on said scale, said digital processing circuit having a software to calculate the weight and height of said subject based on said measurement and background reference signals and using a triangulation method of processing received signals by calculation coordinates X, Y and Z relative to said horizontal plane of said sonar head, and wherein X is the vertical distance between said plane and the top of the head of said subject, and Y and Z are vectors in said plane from the center of said emitter said housing being formed by four parabolic microphones and four conic microphones; said parabolic microphones comprising four parabolic reflectors having a square contour and positioned in a square to form a square housing, a microphone held at a converging point of said reflectors in said horizontal plane; said conic microphones being comprised by four cones disposed on transverse axes disposed between said parabolic reflectors and aligned with said microphones of said reflectors and a microphone at a terminal end of said cones in said horizontal plane and aligned with other microphones.

11. An automatic measuring apparatus as claimed in claim 10, wherein there are a plurality of said sound wave receptors.

12. An automatic measuring apparatus for automatically calculating height and weight of human subjects as claimed in claim 11 wherein said echo signals are emitted at a frequency of 8 KHz to obtain reduced deformations in reflected echoes caused by movement of the subject's head or foreign objects on said subject's head.

13. A measuring apparatus as claimed in claim 11 wherein said sonar head has a housing having said horizontal plane faxing downwards and parallel to said scale, said sound wave emitter being disposed centrally in said housing in said horizontal plane with said sound wave receptors equidistantly spaced about said sound wave emitter in said plane, means to secure said housing with said receptive surface substantially parallel to an upper flat support surface of said scale, said digital processing means also calculating the body surface area of said subject from said signals received from said receptors.

14. A measuring apparatus as claimed in claim 13 wherein there are eight of said receptors positioned about said sound wave emitter on straight axes defining a square configuration.

15. A measuring apparatus as claimed in claim 10 wherein said receptors are each connected to an amplifier, each said amplifiers having their outputs connected to a common A/D converter through a multipolar switch controlled by said digital processing circuit and an amplifier/attenuator connected between said switch and said A/D converter to attenuate signals received from a selected one of said outputs, said amplifier/attenuator having a gain proportional to the square of the flight time of said sound wave generated by said emitter to compensate for loss of power of the echo of said sound wave which is proportional to the square of the distance to an uppermost part of said subject, said flight time being clocked by said processing circuit.

16. A measuring apparatus as claimed in claim 10 wherein there is further provided a temperature sensor to provide a calibration temperature signal representative of the ambient temperature in which said subject is positioned on said scale to obtain a correction signal for calculating the travel distance of said sound wave.

17. A measuring apparatus as claimed in claim 10 wherein said software also provides the percentile for height and weight of the subject using known equations which are stored in a memory of said data processing means, said digital processing circuit having a keypad connected to an input of said computer to input parameters of said subject necessary to calculate said percentile, and a printer secured to an output of said circuit to provide a print-out of said height, weight, body surface area, percentile age and other information pertinent to said subject.

18. A measuring apparatus as claimed in claim 10 wherein there is further provided a vertically upstanding member disposed adjacent said scale to assist positioning a subject upright on said scale and in alignment with said sonar head.

* * * * *